(No Model.)

F. DOUGLAS.
BICYCLE WHEEL.

No. 511,595.

Patented Dec. 26, 1893.

Witnesses.

Inventor.
Frank Douglas
By Bunning and Bunning and Payson
Attorneys.

THE NATIONAL LITHOGRAPHING COMPANY,
WASHINGTON, D. C.

UNITED STATES PATENT OFFICE.

FRANK DOUGLAS, OF CHICAGO, ILLINOIS.

BICYCLE-WHEEL.

SPECIFICATION forming part of Letters Patent No. 511,595, dated December 26, 1893.

Application filed January 3, 1893. Serial No. 457,204. (No model.)

*To all whom it may concern:*

Be it known that I, FRANK DOUGLAS, a citizen of the United States, residing at Chicago, Illinois, have invented certain new and useful Improvements in Bicycles, of which the following is a specification.

The object of my invention has more particular reference to the means for attaching a pneumatic tire to the rim of the wheel, and to the means for inflating and deflating the tire; and my invention consists in the features and details of construction hereinafter described and claimed.

Figure 6:
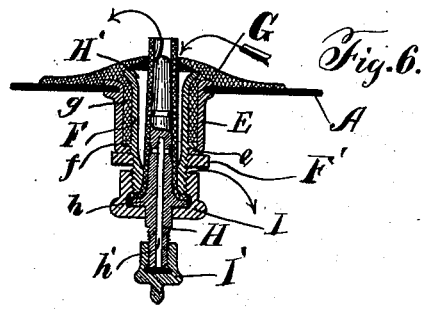
Figure 3:
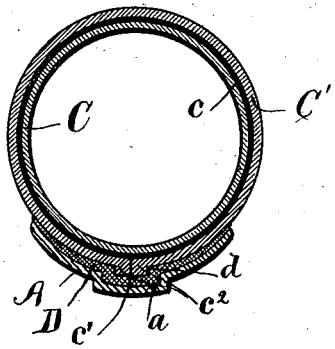
Figure 1:
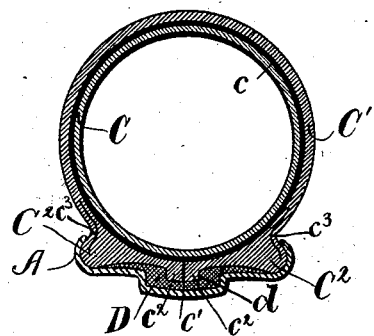
Figure 4:
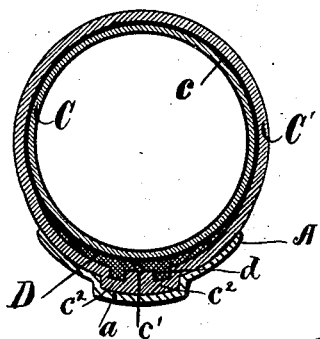
Figure 2:
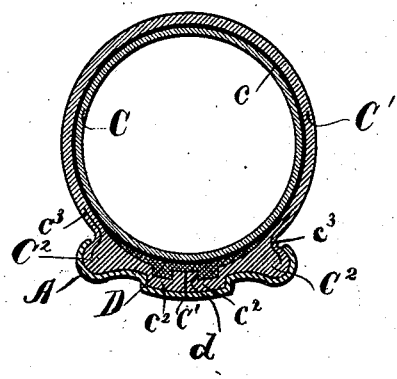
Figure 5:
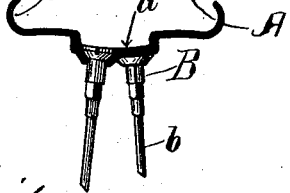

In the drawings, Figure 1 is a transverse section of a tire with the rim of a wheel attached together. Fig. 2 is the same, with the tire somewhat modified. Fig. 3 is the same, showing a modification of the form shown in Fig. 1. Fig. 4 is the same showing a modification of the form shown in Fig. 2. Fig. 5 is a view, partly in section and partly in elevation, showing a rim and nipples for attaching the spokes of a wheel; and Fig. 6 is a vertical, longitudinal, sectional view of the valve for inflating and deflating the tire.

In making my present improvements in bicycles, I make the rim, A, with a circumferential channel, $a$, of the desired depth and width. I make the requisite number of holes to receive nipples, B, in which the ends of the spokes, $b$, are held. The holes for receiving the nipples are pressed or swaged outwardly, so as to form a recess of the proper size and shape to receive the head of the nipple, which is embedded in the rim, as shown in Fig. 5. By thus pressing out the metal of the rim for the reception of the head of the nipple, no metal is cut away, nor is the rim weakened, as is the case where the metal is cut away and the head of the nipple countersunk. I make a tire composed of an inner tube, C, of rubber, and an outer tube, C', of rubber, provided with an inner layer or lining $c$, of cloth or other fibrous material. The outer tube is longitudinally slitted, as shown at $c'$ in the drawings. This slitting of the outer tube is for the purpose of enabling it to be removed from the ring upon which it is molded. I mold on the outer tube, in some cases, longitudinal ledges $C^2$, of a form and size adapted to fit grooves or channels $a'$ along the edges of the rim; and I mold along the slit of the outer tube a projecting longitudinal lug $c^2$, through which the slit is made when the parts are separated to remove the outer tube from the ring on which it is molded. To connect the parts together again, I make what I term a locking strip, D, which is formed of rubber or fibrous material, and which is provided with a longitudinal groove $d$, adapted to receive the longitudinal lug, $c^2$, formed on the outer tube. The locking strip is provided with an external form of a size and shape to fit in the circumferential channel, $a$, of the rim of the wheel. To fasten the parts together, the edges of the outer tube are brought together, so that the longitudinal lug $c^2$ will fit in the groove, $d$, of the locking strip, when the parts are cemented together to become as one, or part of a continuous tube. In order to strengthen the outer tube where it is provided with ledges $C^2$, I prefer to embed in the rubber strips of fibrous material, $c^3$, as shown in Figs. 1 and 2.

In Fig. 2 I have arranged the locking strip on the inside of the outer tube. In this case, the longitudinal lug $c^2$ is on the inside, and the outer tube is molded in form to fit the circumferential channel in the rim of the wheel. In Fig. 3 I have modified the form of the rim of the wheel, omitting the channels and omitting the ledges from the tube. In Fig. 4 I have shown the same arrangement of wheel rim, but have arranged a locking strip on the inside of the outer tube, as in Fig. 2. In all these cases, however, the rim of the wheel is provided with an external form adapted to fit into the channel of the rim. The channel is preferably made with practically rectangular shoulders, and the tube formed with practical rectangular shouldered lugs to fit the same. I prefer, in practice, to make the tube somewhat smaller than the rim of the wheel, so that the tube, when applied to the rim, is applied under tension, or is somewhat stretched in being arranged in place. When the tube is inflated, the lug D is firmly and securely pressed against the side of the circumferential channel in the rim of the wheel, so as to securely connect the two together, and prevent the displacement of the tire on the rim.

In order to inflate and deflate the tube, I make a valve adapted to be attached to the rim of the wheel, and to admit of the ingress or egress of air to and from the tube. In making this valve and attaching it to the rim, I make an outer thimble, E, which is provided with flanges at its upper edge, adapted to be swaged upon the rim around the hole in which it is inserted. This thimble has an inwardly projecting flange, e, as shown in Fig. 6. An inner thimble, F, is inserted in the outer thimble from the inside, so that an outwardly projecting flange, f, on it, rests upon the inwardly projecting flange e. The outer end of the thimble F is screw threaded, so as to receive a nut F'. A rubber valve casing G is arranged to overlap the rim on the inside and with a downwardly projecting flange g, fitting between the outer and inner thimbles. The upper end of the inner thimble is flaring or curved out, so that when it is drawn down securely in place by the nut F', such flange will bear against and upon the valve casing arranged between it and the outer thimble, as shown in Fig. 6. I arrange a valve nipple, H, preferably made of metal, and adapted to be inclosed in a valve tube H', made of rubber, and then to be inserted with its valve tube into the inner thimble, F. The valve nipple is provided with a circumferential flange h, so that the end of the valve tube is spread out upon it to form a packing, as shown in the drawings. The valve nipple is provided with a longitudinal hole, h', extending in from its outer end a desired distance, and then connecting by cross holes with the surface on the inside of the valve tube. A flanged nut, I, is adapted to be inserted over the end of the valve nipple, and to be screwed onto the outer end of the inner thimble F. As this nut is screwed tightly into position, it draws the valve nipple up with it, and clamps or bites the outspread end of the valve tube between the flange h on the nipple and the outer end of the inner tube. A cap I' is screwed onto the end of the valve nipple to close the longitudinal hole in it. When it is desired to inflate the tube, the cap I' is removed, and a pump applied to the end of the nipple. The air passes up through the longitudinal hole h', and out to the circumference of the nipple, and forces its way up between the valve nipple and the valve tube into the interior of the tire, as indicated by the rod. When it is desired to deflate the tube, the nut I is loosened or screwed off, when the air will pass into the inner thimble and down between it and the valve tube, and escape around the outer end of the inner thimble by passing up through the screw threads, or out, if the nut has been entirely removed. In this way, I am able to inflate the tube or to deflate it without one operation interfering with the other.

What I regard as new, and desire to secure by Letters Patent, is—

1. In bicycles, the combination of an inner tube, an outer tube, a locking strip, one of the latter being provided with a longitudinal lug and the other with a longitudinal groove in which the lug is received and also with a longitudinal lug on the side next to the wheel rim, and a wheel rim provided with a longitudinal channel in which the last mentioned lug is received, substantially as described.

2. In bicycles, the combination of an inner tube, an outer tube provided with a longitudinal lug, a locking strip provided with a longitudinal groove in which the lug is received and also with a longitudinal lug on the side next the wheel rim, and a wheel rim provided with a longitudinal channel in which the lug on the locking strip is received, substantially as described.

3. In bicycles, the combination of an inner tube, an outer tube, a locking strip, one of the latter being provided with a longitudinal lug, and a wheel rim provided with a longitudinel channel in which the lug is received, substantially as described.

4. In bicycles, the combination of a wheel rim, an outer thimble attached to the wheel rim and provided at its outer end with an inward flange, an inner thimble provided with an outwardly flaring upper end, a valve casing overlapping the wheel rim on the inside and extending out between the inner and outer thimbles, and a nut on the outer end of the inner thimble for drawing its upper flaring end downward to bite or pinch the valve casing, substantially as described.

5. In bicycles, the combination of a wheel rim, an outer thimble attached to the wheel rim and provided at its outer end with an inward flange, an inner thimble provided with an outward flange adapted to rest upon the inward flange of the outer thimble, a valve casing overlapping the wheel rim on the inside and extending out between the inner and outer thimbles, a valve nipple provided with a longitudinal hole entering from its outer end and opening to its surface within the inner thimble and with an outward circumferential flange, a valve tube inclosing the valve nipple and flaring at its outer end against the circumferential flange, a nut screwing onto the inner thimble and drawing the parts securely together, a flanged nut screwing onto the end of the inner thimble and drawing the nipple up into place, and a cap screwing onto the outer end of the valve nipple, whereby the tire may be inflated through the valve nipple and deflated around the valve nipple when the flanged nut is loosened, substantially as described.

FRANK DOUGLAS.

Witnesses:
THOS. F. SHERIDAN,
SAMUEL E. HIBBEN.